(12) United States Patent
Suzuki

(10) Patent No.: US 7,260,475 B2
(45) Date of Patent: Aug. 21, 2007

(54) NAVIGATION SYSTEM WITH LICENSING FUNCTION

(75) Inventor: Daisuke Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 225 days.

(21) Appl. No.: 11/100,430

(22) Filed: Apr. 7, 2005

(65) Prior Publication Data
US 2005/0228582 A1 Oct. 13, 2005

(30) Foreign Application Priority Data
Apr. 7, 2004 (JP) ............................. 2004-113504

(51) Int. Cl.
*G01C 21/00* (2006.01)
*G06F 17/30* (2006.01)
(52) U.S. Cl. ...................................... 701/208; 701/213
(58) Field of Classification Search ...................... None
See application file for complete search history.

(56) References Cited
U.S. PATENT DOCUMENTS
5,887,269 A * 3/1999 Brunts et al. ............... 701/208

2002/0017977 A1 * 2/2002 Wall .......................... 340/5.28
2002/0059532 A1 5/2002 Ata et al.
2002/0138632 A1 * 9/2002 Bade et al. ................. 709/229

FOREIGN PATENT DOCUMENTS
JP A-11-24781 1/1999
JP A-2002-62142 2/2002

OTHER PUBLICATIONS
IBM Tech. Disc. NN9310199; vol. 36, ISS. 10, pp. 199-200; Oct. 1, 19993.*

* cited by examiner

Primary Examiner—Michael J. Zanelli
(74) Attorney, Agent, or Firm—Posz Law Group, PLC

(57) ABSTRACT

When a navigation system is started for the first time, a time/position information item unique to each navigation system is generated based on a position and time detected for the first time by a GPS receiver of a position detector. This generated time/position information item is stored both in a hard disk of a map data storage device and in an internal memory. When a starting process performed at starting of the system, it is determined whether time/position information items stored in the hard disk and the internal memory accord with each other. When both information items are determined to be according with each other, map data stored in the hard disk is given a license for use.

11 Claims, 5 Drawing Sheets

FIG. 6

ERROR

LICENSE VIOLATION
CONTACT SHOP

FIG. 7

ERROR

UNAUTHORIZED DISK IS INSERTED
INSERT RIGHT DISK

FIG. 8

ERROR

UNAUTHORIZED UPDATE IS DOWNLOADED
DOWNLOAD RIGHT UPDATE

NAVIGATION SYSTEM WITH LICENSING FUNCTION

CROSS REFERENCE TO RELATED APPLICATIONS

This application is based on and incorporates herein by reference Japanese Patent Application No. 2004-113504 filed on Apr. 7, 2004.

FIELD OF THE INVENTION

The present invention relates to a navigation system having a licensing function.

BACKGROUND OF THE INVENTION

There is proposed a navigation system preventing unauthorized use of map information by users (refer to Patent Document 1). Here, encrypted licensing codes are used for licensing the user. Namely, the licensing codes include a map designating code for designating a map storage medium, a device designating code for designating a navigation system using the map storage medium, and a user authorized region code for indicating a region of multiple map information items for a user to be allowed to access. The encrypted licensing codes are decrypted and verified, and then a user can start to use the licensed map information.

Patent Document 1: JP-2002-62142 A

In the above system, the device designating code is formed as a unique code by combining a product number, a serial number, and the like of the navigation system. This formed device designating code is previously stored in a storage device of the navigation system when shipment. This involves additional steps relating to the device designating code as developing steps, so that the costs of the system are expected to increase.

Further, this needs hardware devices or software programs dedicated for decrypting the licensing code, which also leads to increase in the costs of the system.

SUMMARY OF THE INVENTION

It is an object of the present invention to provide a navigation system capable of solving the above problems. Namely, this system includes a licensing function that helps prevent unauthorized use by users without using unique code previously registered, and hardware devices/software programs dedicated for encrypting and decrypting codes.

To achieve the above object, a navigation system is provided with the following. A storage medium interfacing unit is included for storing a storage medium that stores data. A detection unit is included for detecting a detection item including at least one of a time and a position. An information item generation unit is included for generating an information item based on the detected detection item. A writing unit is included for writing the generated information item in the storage medium and in an internal memory of the system when the detection unit detects the detection item first when and after the system is started first. A use determination unit is included for determining whether an information item written in the storage medium and an information item written in the internal memory accord with each other, when data stored in the storage medium is used. Further, a licensing unit is included for giving a license for use of the data stored in the storage medium when it is determined that the information item written in the storage medium and the information item written in the internal memory accord with each other.

Under this structure, the previous registration that is necessary in the conventional manner becomes unnecessary. Instead, the information item that is unique to the system is generated when the system is, for instance, initially started after being installed. When the above information items stored in the storage medium and in the internal memory are determined to be not according with each other, the data stored in the storage medium is determined to be copied illicitly or without being authorized, or be stolen. As a result, dedicated hardware devices or software programs for encrypting or decrypting that are required for the conventional manner become unnecessary for determining a license for use of the data stored in the storage medium.

BRIEF DESCRIPTION OF THE DRAWINGS

The above and other objects, features, and advantages of the present invention will become more apparent from the following detailed description made with reference to the accompanying drawings. In the drawings:

FIG. 6 is a view showing an example of an error display window according to the first embodiment;

FIG. 7 is a view showing an example of an error display window according to the second embodiment; and FIG. 8 is a view showing an example of an error display window according to the modification of the second embodiment.

DETAILED DESCRIPTION OF THE PREFERRED EMBODIMENTS

A navigation system mounted in a subject vehicle according to an embodiment of the present invention will be explained below.

First Embodiment

Figure 1:
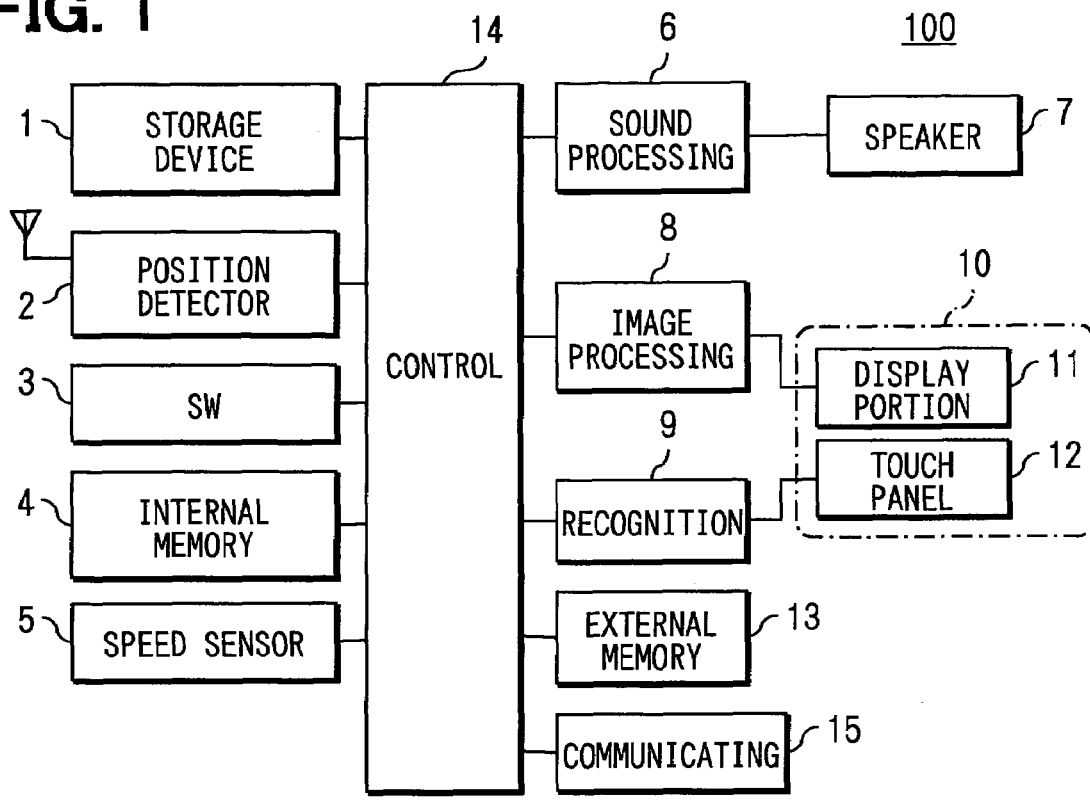
FIG. 1 is a block diagram of a structure of a navigation system according to a first embodiment of the present invention.

As shown in FIG. 1, a navigation system 100 according to this embodiment includes a map data storage device 1, a position detector 2, an operating switch group 3, an internal memory 4, a vehicle speed sensor 5, a sound signal processing device 6, a speaker 7, an image signal processing device 8, a touch-panel recognition circuit 9, a display device 10, an external memory 13, and a navigation control circuit 14.

The control circuit 14 is a usual computer that includes a CPU, a ROM, a RAM, an input/output, and a bus line connecting the foregoing components. The ROM is stored with programs for the control circuit 14 to execute, so the CPU or the like performs given processing according to the programs.

The map data storage device 1 is used for storing map data by interfacing with a read/write storage medium such as a hard disk (HD) that stores the map data. The map data includes road data, index data, display data, or the like. Parts of the map data can be rewritten or added to update the map data. The read/write storage medium can include not only the hard disk but also a CD-RW, a DVD-RAM, and a memory card.

The position detector 2 includes a GPS (Global Positioning System) receiver detecting a time and a current position of a subject vehicle based on radio waves from satellites, a gyroscope detecting an angle speed around a vertical axis of the subject vehicle, and a geomagnetic sensor detecting a vehicle's advancing orientation (non shown). These sensors or the like individually have different-natured errors, so multiple sensors are used by being mutually complemented. Further, vehicle speeds from the vehicle speed sensor 5 can complement the detection. The vehicle speed sensor 5 detects the vehicle speed from detection result of revolution speeds of the vehicle wheels.

The operating switch group 3 uses a touch panel switch or mechanical switches integrated to the display device 10 for various inputs. The internal memory 4 stores position data of memory points, and the like. The position data of memory points is designated by a user. Here, when the position data is stored in the RAM included in the control circuit 14, this internal memory can be unnecessary.

The sound signal processing device 6 includes a sound synthesizing circuit, and a sound signal amplification circuit (non shown) to produce sound signals outputted to the speaker 7. The image signal processing device 8 includes an image processing processor, and a VRAM (Video RAM) (non shown) to produce image signals displayed on a display portion 11 of the display device 10.

The touch-panel recognition circuit 9 converts a pressed position of the touch panel 12 formed on a screen of the display portion 11 to an electric signal and outputs it to the control circuit 14. The external memory 13 is an interface to which a storage medium such as a CD, a DVD, or a memory card is inserted in use for reading data from the storage medium.

The navigation system 100 includes a routing assistance function. In the routing assistance function, when a destination is inputted though the operating switch group 3, a guiding route to the destination from the current position or the position designated by a user is automatically set. Then, the user can be guided to the destination by displaying a road map following the vehicle's advancement. The system 100 further includes a current position display function for displaying a map surrounding a current position and a facility search function for searching for a facility position.

The system 100 of this embodiment is provided with a licensing function that helps prevent an unauthorized use of map data. Suppose a case where a hard disk is stolen from the map data storage device 1 or map data stored in the hard disk is illicitly copied. Even in this case, this function helps prevent the stolen hard disk or the copied map data from being used without being authorized.

This licensing function includes an initial registration process and a starting process. In the initial registration process, a unique information item with respect to each navigation system is written (or stored) both to the hard disk of the map data storage device 1 and to the internal memory 4. The starting process is performed each time the system 100 starts. When the map data in the hard disk is used, whether the unique information item stored in the hard disk accords with the unique information item stored in the internal memory 4 is determined. When both unique information items are determined to be according with each other, licensing of the map data stored in the hard disk can be given to the user. By the given licensing, the user can use the map data stored in the hard disk until the power of the system 100 turns off.

In contrast, when both the unique information items are determined to be not according with each other, the map data stored in the hard disk is determined to be illicit or unauthorized. An error display (refer to FIG. 6) that indicates the relevant map data violates licensing agreement is thereby shown in the display device 10, or an error message is outputted using voices from the speaker 7. Thus, the user can be notified that the map data stored in the hard disk cannot be used.

The initial registration process and the starting process of the features of this embodiment will be explained with reference to FIGS. 2, 3, respectively.

Figure 2:
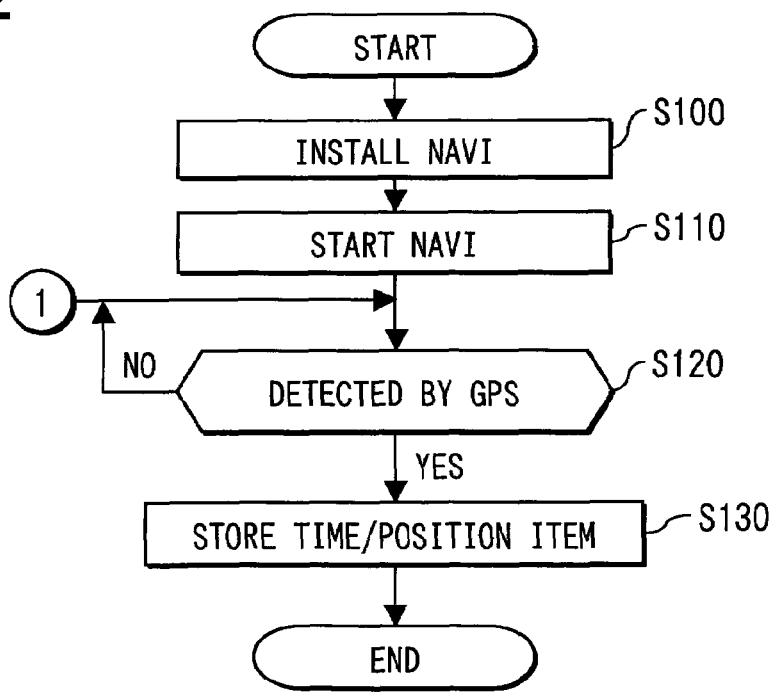
FIG. 2 is a flowchart diagram of an initial registration process according to the first embodiment.

At Step S100 in FIG. 2 explaining the initial registration process, the navigation system 100 is installed in a subject vehicle or the like. At Step S110, the system is started. At Step S120, it is determined whether the position detector 2 detects a time and a position. When this determination is affirmed, the sequence goes to Step S130. When negated, the sequence enters a waiting state until a time and a position are detected.

At Step S130, an information item of time and position information (time/position information item) is generated and then stored in the hard disk and the internal memory 4. The time/position information item is generated based on time data and position data. For instance, 6-digit time data of 141520 (2 o'clock 15 minutes 25 seconds p.m.) and 14-digit position data of 03543261370225 (at latitude 35 degrees 43 minutes 26 seconds north, longitude 137 degrees 02 minutes 25 seconds east) combine to generate 20-digit time/position information item of 14152003543261370225.

This embodiment focuses a low probability that, after installed or mounted in vehicles, navigation systems 100 are started in a same position at a same time for the first time. Further, this embodiment focuses availability of the GPS mounted in vehicles that can detects times and positions. Namely, when the navigation system 100 is started, a time/position information item unique to each navigation system 100 is generated based on a time and a position initially detected by the GPS, so this generated time/position information item is stored in the hard disk and the internal memory 4.

Thus, without previously registering a unique code as in a conventional manner, the time/position information item unique to each navigation system 100 can be generated when the navigation system 100 is initially started after being installed.

Further, when the time/position information item is generated at Step S130, a map code (registered trade mark) using 6 to 10 digits can be substituted for the position information. Namely, the map code and the time information combine to generate a time/position information item that has a smaller number of digits.

Next, the starting process in the licensing function will be explained below. At Step S200 in FIG. 3, the navigation system is started. At Step S210, it is determined whether a time/position information item is already registered or not. When this determination is affirmed, the sequence goes to Step S230. When negated, the above-described initial registration process (Step S120, S130 in FIG. 2) is subsequently executed at Step S220. Here, whether the time/position information item is registered or not is determined by whether the time/position information item can be referred to in the hard disk or the internal memory 4. Namely, when the time/position information item can be referred to, it is determined that the data is registered. In contrast, when the time/position information item cannot be referred to, it is determined that the data is not registered.

At Step S230, it is determined whether a time/position information item in the hard disk and a time/position information item in the internal memory 4 accord with each other. Here, when both accord with each other, the map data stored in the hard disk is given license for use at Step S240. By this license, the current position display function is executed by using the map data stored in the hard disk to show a map surrounding a current position of the vehicle. Until the system 100 is powered off, the map data stored in the hard disk can be used for the routing assistance function or other functions.

In contrast, when both do not accord with each other at Step S230, the map data stored in the hard disk is determined to be unauthorized or illicit. Then, at Step S250, an error display (1) (refer to FIG. 6) that indicates the relevant map data is unauthorized or illicit is thereby shown in the display device 10, or an error message is outputted using voices from the speaker 7. Thus, the user can be notified that the map data stored in the hard disk cannot be used.

Thus, in the licensing function of the navigation system 100 of this embodiment, the initial registration process takes place as follows. When the system 100 is started for the first time, the GPS receiver of the position detector 2 detects the time and the position. The time/position information item unique to the system itself is generated based on the detected time and position, and stored in the hard disk and the internal memory 4. Thereafter, the starting process takes place as follows. When the system 100 is started and the map data in the hard disk is to be used, it is determined whether time/position information items in the hard disk and in the internal memory 4 are according with each other. When both are determined to be according with each other, the map data stored in the hard disk is given the license for use.

Under this structure of this embodiment, the previous registration that is necessary in the conventional manner becomes unnecessary. Instead, the time/position information item unique to the system 100 is generated when the system 100 is initially (or first) started after being installed.

In contrast, when both time/position information item are determined to be not according with each other, the map data stored in the hard disk is determined to be copied illicitly or without being authorized, or be stolen. Therefore, the map data stored in the hard disk is disabled to be in use.

As a result, dedicated hardware devices or software programs for encrypting or decrypting that are required for the conventional manner become unnecessary for this licensing function. By this licensing function, even when the hard disk is stolen or the map data stored in the hard disk is illicitly copied, the stolen hard disk or the copied map data can be prevented from illicitly being used.

Modification in First Embodiment

In the above embodiment, the time and the position are at the same time used for generating, as a unique code for each system, the data in use for the licensing function. However, either the time or the position can be used alone for generating the unique code in this function. Namely, the time information includes "second," so there is low probability that the systems are started at the same time. Therefore, the data generated only from the time can be also unique to each system 100.

In contrast, even when only position data is used for generating the unique code, this generated unique code can be properly unique to the system by setting the timing of the initial registration process. Namely, the process at Step S130 where the generated unique code is stored in the hard disk and the internal memory 4 can be performed, for instance, at a user's home after a user receives.

Second Embodiment

A second embodiment has many parts similar to the first embodiment, so the similar parts will be eliminated in explanation and the different parts will be mainly explained below.

The first embodiment includes the initial registration process performed when the system is started for the first time, and the starting process performed each time the system is started. In contrast, the second embodiment further includes an updating process performed when the map data stored in the hard disk of the map data storage device 1 is updated.

Figure 3:
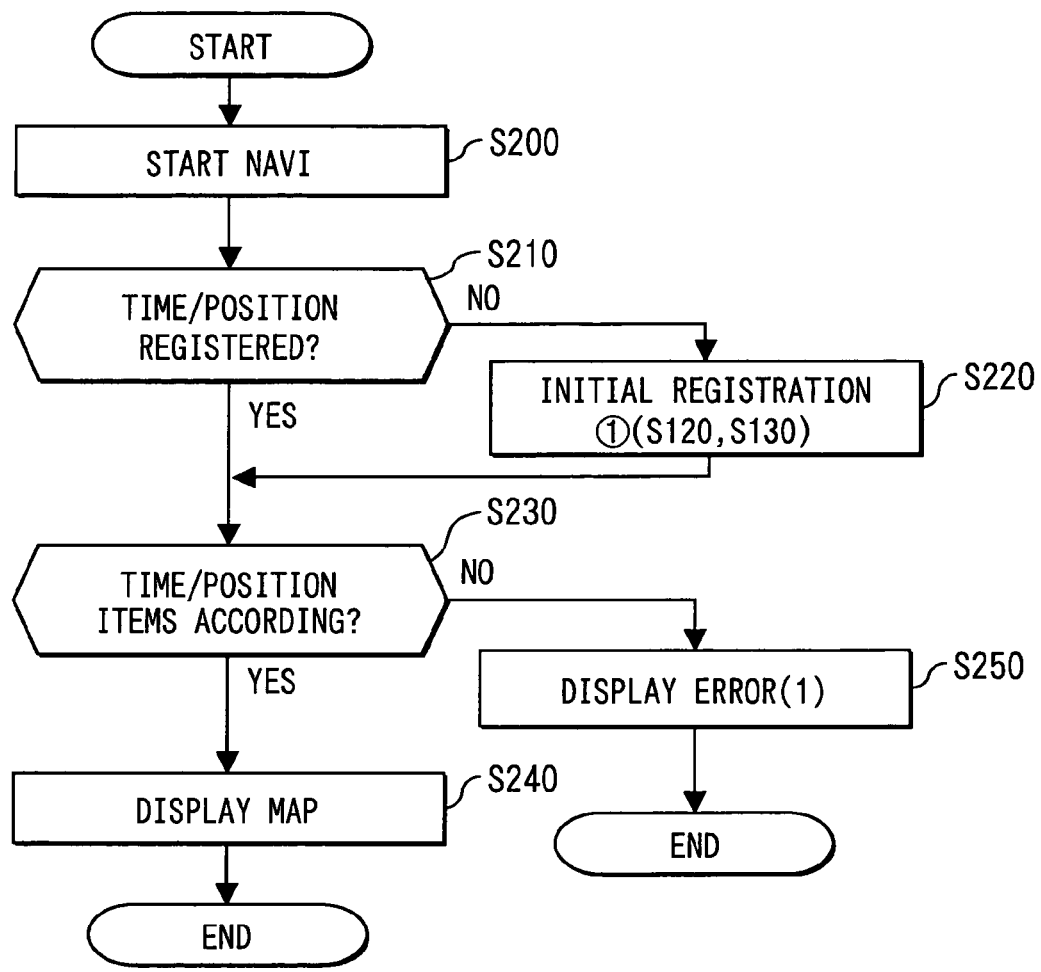
FIG. 3 is a flowchart diagram of a starting process according to the first embodiment.
Figure 4:
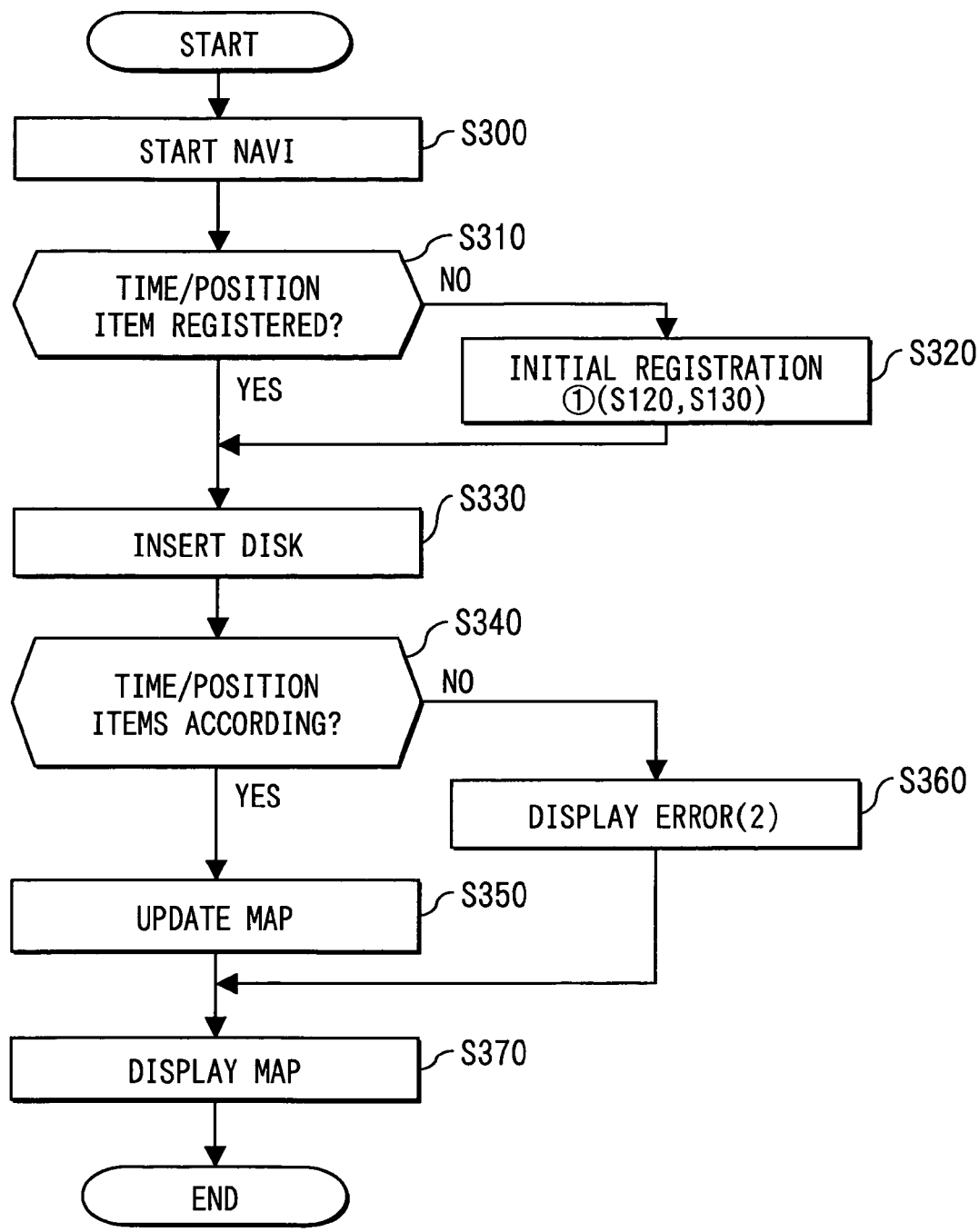
FIG. 4 is a flowchart diagram of an updating process according to a second embodiment of the present invention.

In FIG. 4, processes at Steps S300 to S320 are the same as those at Steps S200 to S220 in FIG. 3, so explanation will be eliminated.

At Step S330, a storage medium such as a CD (hereafter referred to as "disk") storing a copied map data update is inserted into the external memory 13. This storage medium can be substituted by a DVD or a memory card. In this embodiment, this map data update is downloaded using a personal computer from a map manufacturer or provider via the Internet or the like. Before being downloaded, the time/position information item of the hard disk is inputted so as to be included in the map data update. This inputted time/position information item is then included in the map data that will be downloaded from the manufacturer.

Thereafter, the downloaded map data update is copied to the disk, so that the disk stores the time/position information item in addition to the map data update itself. Here, when the disk that stores the map data update including the right time/position information item is produced, a previously prepared tool that cannot be used by the user must be used. This tool is, for instance, a diagnosis tool for the navigation system 100. By using the tool, the time/position information item stored in the hard disk is referred to and then inputted when the map data update is to be downloaded. By this procedure, the map data update including the right or authorized time/position information item can be stored in the disk.

At Step S340, it is determined whether a time/position information item stored in the hard disk and a time/position information item stored in the disk inserted into the external memory 13 accord with each other. When both are determined to be according with each other, a license for use of the map data update stored in the disk is given. The map data stored in the hard disk is thereby updated by using the map data update stored in the disk.

In contrast, when both are determined to be not according with each other, an error display (2) (refer to FIG. 7) that indicates the map data update is unauthorized or illicit is thereby shown in the display device 10, or an error message is outputted using voices from the speaker 7. Thus, the user can be notified that the map data update stored in the disk cannot be used.

At Step S370, the current position display function is performed with the map data that is updated or not updated at Step S350. Thereafter, until the system 100 is powered off, the map data stored in the hard disk is used for the routing assistance function or the like.

Thus, in the licensing function in the navigation system 100 of the second embodiment, the updating process takes place as follows. Whether a time/position information item stored in the hard disk and a time/position information item stored in the map data update accord with each other is determined. When this determination is affirmed, the map data update is given the license for use. This enables the unauthorized use of the map data update that is illicitly copied to be prevented from being used when the map data stored in the hard disk is updated.

Modification to Second Embodiment

In the above embodiment, when the map data update is obtained, downloading is adopted by using the personal computer via the Internet. Then, the downloaded map data update is copied to the disk, so that the disk storing the map data update is produced. However, the navigation system 100 itself can be provided with a method 15 (in FIG. 1) for communicating with the Internet such as a cell phone, so that the update can be directly downloaded to the system 100.

Figure 5:
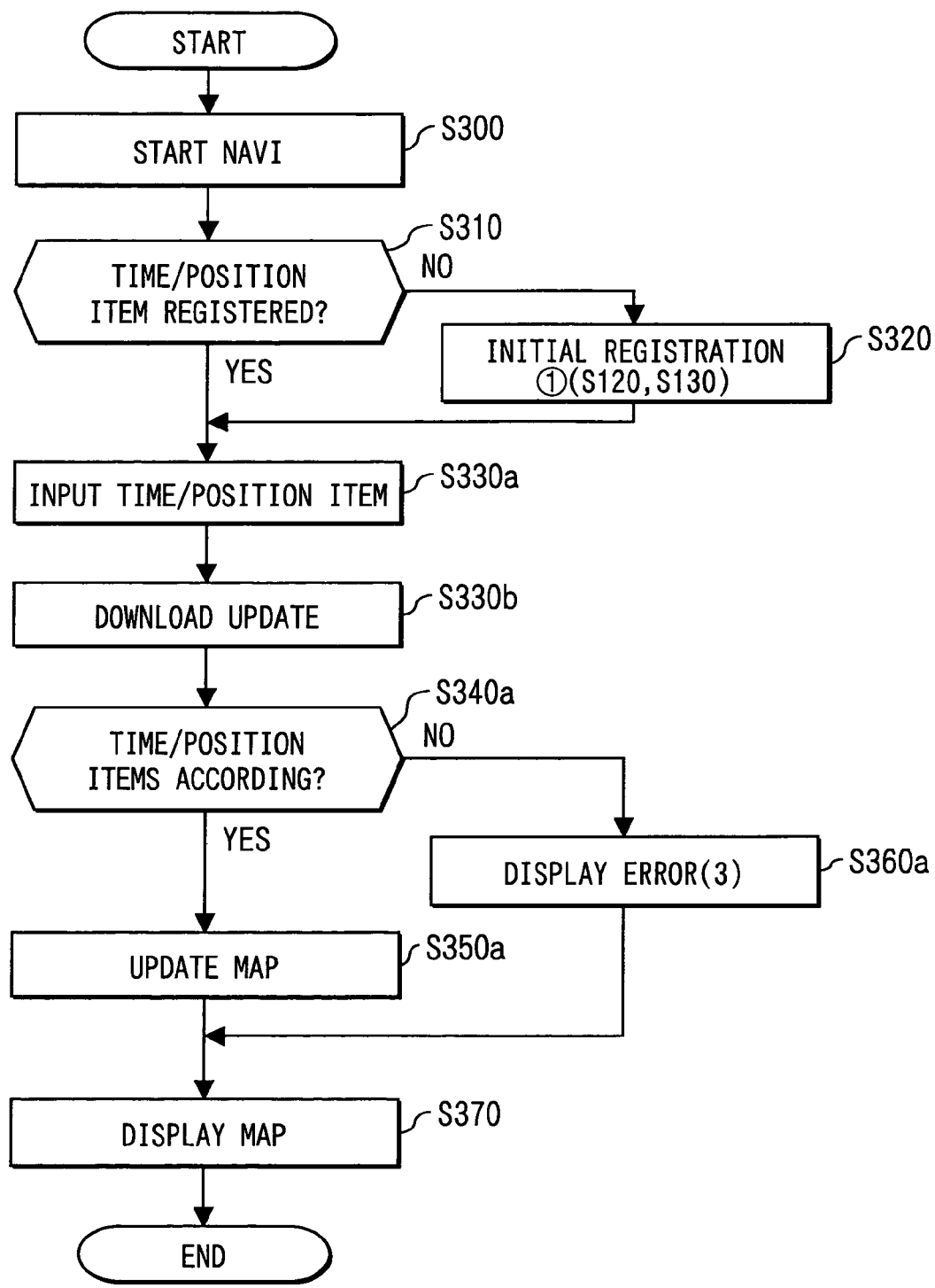
FIG. 5 is a flowchart diagram of an updating process according to a modification of the second embodiment.

Hereunder, the updating process where the map data update is directly downloaded to the navigation system 100 will be explained with reference FIG. 5. Here, the processes at Steps S300 to S320, S370 are the same as those at the above-described second embodiment, so that explanation will be eliminated below.

At first, the system 100 connects to a map manufacturer or provider with the communicating method 15. At Step S330a, a time/position information item is inputted through the operating switch group 3. Here, the right time/position information item is referred to and obtained from the hard disk by using the above-described previously prepared tool that cannot be used by users such as the diagnosis tool for the system 100. The map manufacturer receives this inputted time/position information item and generates a map data update including the time/position information item.

At Step S330b, the map data update is downloaded. At Step S340a, it is determined whether a time/position information item stored in the hard disk and a time/position information item stored in the downloaded update accord with each other. When both are determined to be according with each other, the downloaded map data update is given the license for use and used for updating the map data stored in the hard disk at Step S350a.

In contrast, when both do not accord with each other at Step S340a, the downloaded map data update is determined to be unauthorized or illicit. Then, at Step S360a, an error display (3) (refer to FIG. 8) that indicates the relevant map data update is unauthorized or illicit is thereby shown in the display device 10, or an error message is outputted using voices from the speaker 7. Thus, the user can be notified that the downloaded map data update cannot be used.

It will be obvious to those skilled in the art that various changes may be made in the above-described embodiments of the present invention. However, the scope of the present invention should be determined by the following claims.

What is claimed is:

1. A navigation system comprising:
a storage medium interfacing unit that interfaces with a storage medium that stores data;
a detection unit that detects a detection item including at least one of a time and a position;
an information item generation unit that generates an information item based on the detected detection item;
a writing unit that writes the generated information item in the storage medium and in an internal memory of the system when the detection unit first detects the detection item after the system is started for a first time;
a use determination unit that determines whether an information item written in the storage medium and an information item written in the internal memory accord with each other, when data stored in the storage medium is used; and
a licensing unit that gives a license for use of the data stored in the storage medium when it is determined that the information item written in the storage medium and the information item written in the internal memory accord with each other.

2. The navigation system of claim 1,
wherein the information item is generated by the information item generation unit based on the detection item first detected by the detection unit when the system is started for the first time.

3. The navigation system of claim 1,
wherein the detection unit detects the detection item including the time that includes hours, minutes, and seconds.

4. The navigation system of claim 1, farther comprising:
an update obtaining unit that obtains an update from an update storage medium storing the update including an information item that is used for updating data stored in the storage medium; and
an update determination unit that determines whether an information item written in the storage medium and an information item stored in the update storage medium accord with each other, when data stored in the storage medium is updated,
wherein the licensing unit gives a license for use of the update when it is determined that the information item written in the storage medium and the information item stored in the update storage medium accord with each, other.

5. The navigation system of claim 4, further comprising:
an update-disabled notification unit that indicates that the update is not able to be used when the update determination unit determines that the information item written in the storage medium and the information item stored in the update storage medium do not accord with each other.

6. The navigation system of claim 4,
wherein the storage medium interfacing unit stores the storage medium that stores map data,
wherein the use determination unit determines when the map data is used, and
wherein the update determination unit determines when the map data is updated.

7. The navigation system of claim 1, further comprising:
an input unit that inputs an information item;
an update obtaining unit that obtains by using communicating means an update that includes the inputted information item and is used for updating data stored in the storage medium; and
an update determination unit that determines whether an information item written in the storage medium and an information item included in the update accord with each other, whew data stored in the storage medium is updated, wherein the licensing unit gives a license for use of the update when it is determined that the information item written in the storage medium and the information item included in the update accord with each other.

8. The navigation system of claim 7, further comprising:
an update-disabled notification unit that indicates that the update is not able to be used when the update determination unit determines that the information item written in the storage medium and the information item included in the update do not accord with each other.

9. The navigation system of claim 1,
wherein the detection unit includes:
   a GPS receiver that receives signals from GPS satellites; and
   an information item computation unit that computes at least one of a time and a position based on the received signals.

10. The navigation system of claim 1, further comprising:
a map code conversion unit that converts the detection item including the position to a map code,
wherein the information item generation unit generates an information item based on at least one of the map code and a detection item including the time.

11. The navigation system of claim 1, further comprising:
a use-disabled notification unit that indicates that the data stored in the storage medium is not able to be used when the use determination unit determines that the information item written in the storage medium and the information item written in the internal storage do not accord with each other.

* * * * *